US010836092B2

(12) United States Patent
Krause et al.

(10) Patent No.: US 10,836,092 B2
(45) Date of Patent: Nov. 17, 2020

(54) METHOD FOR MANUFACTURING A MATERIAL STRAND ASSEMBLY

(71) Applicant: Cooper Standard GmbH, Lindau (DE)

(72) Inventors: Fritz Krause, Hergatz (DE); Thomas Koch, Retzstadt (DE)

(73) Assignee: Cooper Standard GmbH, Lindau (DE)

( * ) Notice: Subject to any disclaimer, the term of this patent is extended or adjusted under 35 U.S.C. 154(b) by 47 days.

(21) Appl. No.: 16/035,136

(22) Filed: Jul. 13, 2018

(65) Prior Publication Data

US 2019/0016036 A1 Jan. 17, 2019

(30) Foreign Application Priority Data

Jul. 17, 2017 (EP) ..................................... 17181669

(51) Int. Cl.
*B23Q 17/00* (2006.01)
*B29C 48/92* (2019.01)
(Continued)

(52) U.S. Cl.
CPC ................ *B29C 48/92* (2019.02); *B26D 1/09* (2013.01); *B26D 5/007* (2013.01);
(Continued)

(58) Field of Classification Search
CPC ..... B29C 48/92; B29C 48/28; B29C 48/0021; B29C 48/12; B29C 48/0022; B29C 2948/92142; B29C 2948/92285; B29C 2948/92942; B29C 2948/92638; B29C 2948/9278; B29C 2948/9279;
(Continued)

(56) References Cited

U.S. PATENT DOCUMENTS

2013/0117994 A1 5/2013 Fellner et al.
2016/0311297 A1* 10/2016 Kast ..................... B23P 19/047

FOREIGN PATENT DOCUMENTS

DE 102005028069 A1 * 5/2006 .............. B60J 10/80
DE 102005028069 A1 5/2006
(Continued)

OTHER PUBLICATIONS

English translation of DE102005028069 (Year: 2006).*
European Search Report issued for EP 17181669.7 dated Jan. 16, 2018.

*Primary Examiner* — Jun S Yoo
(74) *Attorney, Agent, or Firm* — Reising Ethington, P.C.

(57) ABSTRACT

A method for manufacturing a material strand assembly for a vehicle. The method includes: extruding strand material in an extruder so that an extruded material strand is produced; monitoring the quality of the extruded material strand so as to detect faults of the extruded material strand; in case of a detection of a fault, cutting out the fault from the material strand and re-joining cutting end faces, thus producing a joint, so that a faultless material strand is produced. The cutting-out step is conducted such that any two adjacent joints are at a minimum joint distance from each other. The faultless material strand is stored in a storage unit so as to produce the material strand assembly. The extruded material strand is passed through a first strand accumulator between the extruder and the cutting arrangement and through a second strand accumulator between the cutting arrangement and the storage unit.

9 Claims, 6 Drawing Sheets

(51) Int. Cl.
  *B29C 48/12* (2019.01)
  *B29C 48/00* (2019.01)
  *B29C 48/28* (2019.01)
  *B29D 99/00* (2010.01)
  *B26D 5/00* (2006.01)
  *B26D 1/09* (2006.01)
  *B29K 21/00* (2006.01)
  *B26D 7/18* (2006.01)
  *B26D 11/00* (2006.01)

(52) U.S. Cl.
  CPC ...... *B29C 48/0021* (2019.02); *B29C 48/0022* (2019.02); *B29C 48/12* (2019.02); *B29C 48/28* (2019.02); *B29D 99/0053* (2013.01); *B26D 7/1818* (2013.01); *B26D 11/00* (2013.01); *B29C 2793/009* (2013.01); *B29C 2948/9278* (2019.02); *B29C 2948/9279* (2019.02); *B29C 2948/92142* (2019.02); *B29C 2948/92285* (2019.02); *B29C 2948/92295* (2019.02); *B29C 2948/92447* (2019.02); *B29C 2948/92638* (2019.02); *B29C 2948/92942* (2019.02); *B29K 2021/00* (2013.01); *B29K 2021/003* (2013.01)

(58) Field of Classification Search
  CPC ........... B29C 2948/92295; B29C 2948/92447; B29C 2793/009; B29D 99/0053; B26D 11/00; B26D 5/007; B26D 1/09; B26D 7/1818; B29K 2021/00; B29K 2021/003
  See application file for complete search history.

(56) References Cited

FOREIGN PATENT DOCUMENTS

| | | |
|---|---|---|
| DE | 102010026669 A1 | 1/2012 |
| DE | 102013114775 A1 | 6/2015 |
| EP | 1733839 B1 | 4/2009 |
| WO | WO2017/125156 A1 | 7/2017 |

\* cited by examiner

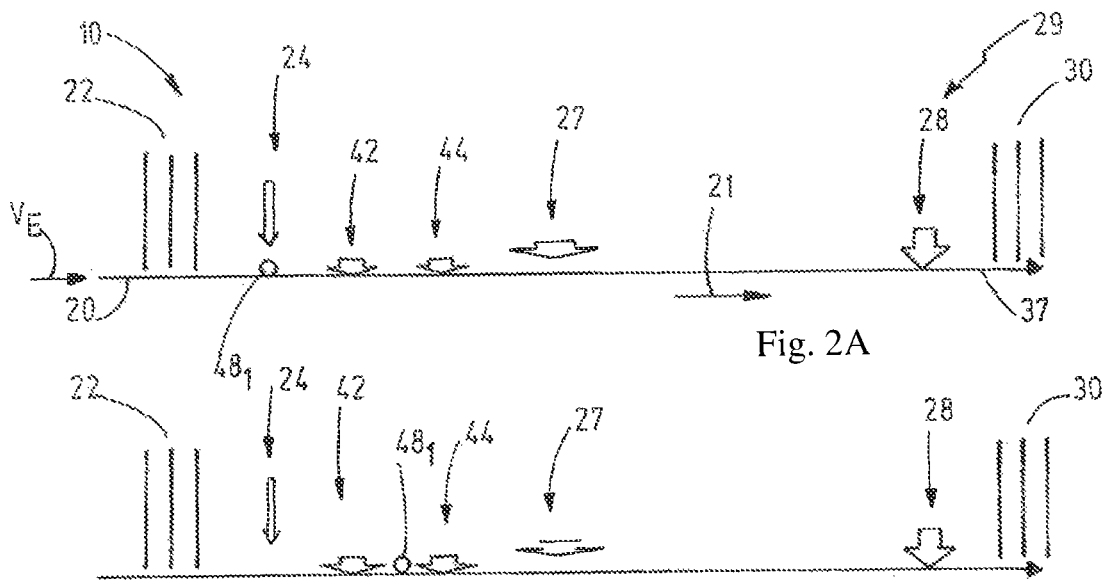
Fig. 2A
Fig. 2B
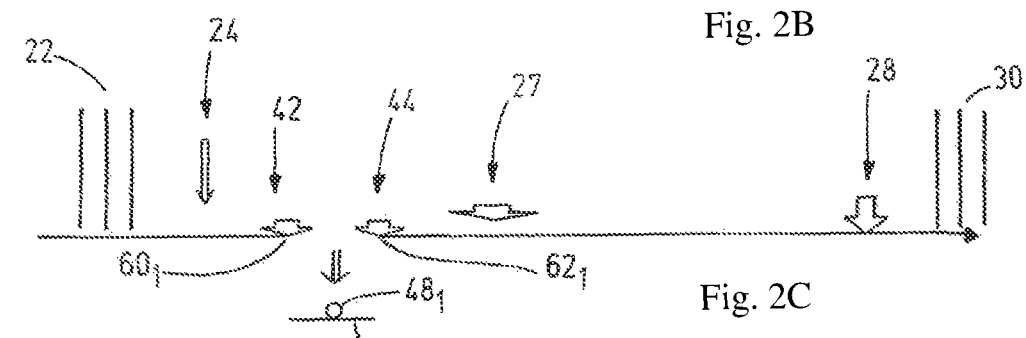
Fig. 2C
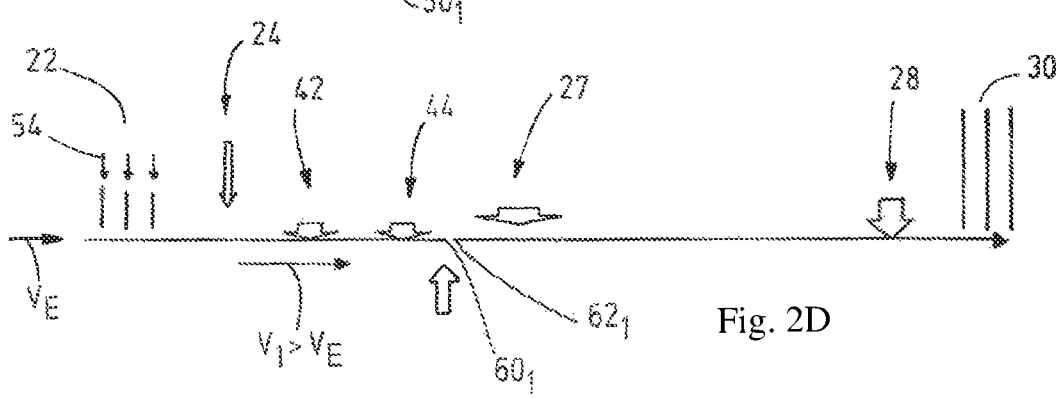
Fig. 2D
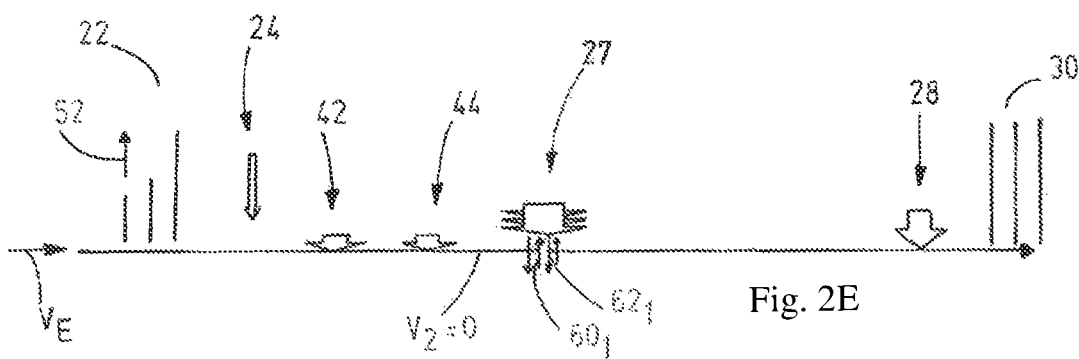
Fig. 2E

METHOD FOR MANUFACTURING A MATERIAL STRAND ASSEMBLY

CROSS REFERENCE TO RELATED APPLICATIONS

This application claims the priority of European patent application EP 17 181 669.7, filed Jul. 17, 2017, the entire content of this earlier application being incorporated herein by reference.

BACKGROUND

The present invention relates to a method for manufacturing a material strand assembly for a vehicle, particularly for sealing a body opening of a vehicle part. Further, the present invention relates to a manufacturing apparatus for manufacturing a material strand assembly, and further relates to a material strand assembly manufactured by such method or apparatus. Finally, the present invention relates to a method for applying a material strand strip to a vehicle part.

In the technical field of manufacturing vehicle bodies, it is known to apply material strands to body openings, for example door openings or window openings. The material strand is typically made from a radially elastically deformable material, so as to provide the necessary sealing properties. Typical material examples are TPE (thermoplastic elastomer) and EPDM (ethylene propylene diene monomer rubber).

Other types of material strands can be used for trimming or fastening purposes in relation to body openings, particularly doors, windows, lids etc.

The material strands are typically produced by an extrusion process. In many cases, material strand strips with a predefined strip length are cut off from the extruded material at a manufacturing site, and are then collectively shipped to an application site, typically an OEM.

Another concept for transporting the material strands to an application site, is the so-called "endless" concept. Here, at the manufacturing site, an extruded material strand is continuously wound on a reel, thus forming a material strand assembly. The reel with the material strand wound thereon is then transported to the application site, where the material strand is un-wound from the reel and material strand strips are cut-off at the predefined strip length.

The application of the material strand strips to the vehicle body can be made manually, or can be conducted by robots. The step of cutting-off material strand strips from an un-wound material strand can also be conducted automatically.

From document EP 1 733 839 B1, it is known to form a seal or a cover at a seal carrier or a cover carrier, particularly at a vehicle door or a bodywork cut-out, wherein strip material forming the seal or cover is unwound from a reel or coil. The unwound strip material is fed to the carrier and continuously connected in strip longitudinal direction with the carrier. An end section corresponding with the length of the seal is separated from the fed strip material. The strip material unwound from the reel is checked prior to connection with the carrier and sections of the strip material ascertained to be faulty are separated and discarded as waste. The strip material is further checked prior to winding up on the reel. Sections, which are recognized as faulty in the check prior to winding up, of the strip material are marked and/or start and end coordinates of faulty sections are stored. The separation of faulty sections from the strip material unwound from the reel is carried out on the basis of the markings produced and/or on the basis start and end coordinates stored prior to the winding-up of the strip material on the reel. Preferably, prior to the winding-up on the reel, faulty sections, the length of which exceeds a predetermined value, are separated from the strip material, and two ends, which are formed by the separation, of the strip material are connected together. This method is meant to reduce the outlay that is necessary for manufacturing the material strand at the manufacturing site, as the processed wound-up material strand need not be faultless.

SUMMARY

Against the above background, it is an object of the invention to provide an improved method for manufacturing a material strand assembly, an improved manufacturing apparatus for manufacturing a material strand assembly, an improved material strand assembly, and an improved method for applying a material strand strip to a vehicle part.

The above object may be achieved by a method for manufacturing a material strand assembly for a vehicle, particularly for sealing a body opening of a vehicle part, including the steps of: extruding strand material in an extruder so that a material strand is produced; monitoring the quality of the extruded material strand so as to detect faults of the material strand; in case of a detection of a fault, cutting out the fault from the material strand, using a cutting arrangement, and re-joining cutting end faces, thus producing a joint, so that a faultless material strand is produced, wherein the cutting-out step or the step of detection and cutting-out is conducted such that any two adjacent joints are at a minimum joint distance from each other; storing the faultless material strand in a storage unit so as to produce the material strand assembly; wherein the extruded material strand is passed through a first strand accumulator between the extruder and the cutting arrangement and/or wherein the faultless material strand is passed through a second strand accumulator between the cutting arrangement and the storage unit.

Further, the above object may be achieved by a manufacturing apparatus for manufacturing a material strand assembly, particularly for conducting a method for manufacturing a material strand assembly according to the invention, comprising: an extruder for producing an extruded material strand, a monitoring device for monitoring the quality of the extruded material strand, such that faults of the extruded material strand can be detected, a cutting arrangement for cutting out detected faults from the extruded material strand, such that cutting end faces are created, a joining device for re-joining the cutting end faces, thus producing a joint, so that a faultless material strand is produced, wherein the cutting arrangement is adapted to conduct the cutting-out step such that any two adjacent joints are at a minimum joint distance from each other, and a storing device for storing the faultless material strand in a storage unit.

Further, the above object may be achieved by a material strand assembly, manufactured by the method according to the invention and/or with the manufacturing apparatus according to the invention.

Finally, the above object may be achieved by a method for applying a material strand strip to a vehicle part, wherein the applied material strand strip has a predefined strip length, including the steps: un-storing a faultless material strand from a material strand assembly according to the invention, inspecting the un-stored faultless material strand for joints, in case that the un-stored faultless material strand does not include a joint, cutting off a material strand strip from the un-stored faultless material strand and applying the material strand strip to a vehicle part, or in case that the un-stored faultless material strand includes a joint, cutting off a material strand portion which includes the joint, from the un-stored faultless material strand, and discarding the cut-off material strand portion as waste.

The present invention was made in order to overcome disadvantages of the above discussed prior art. Namely, in the prior art a lot of waste material is produced at the application site, because the wound-up material strand may include a significant number of faults, in which case the respective faulty sections have to be cut out from the unwound material strand. Further, the faulty sections that are wound on the reel, may have varying, non-uniform lengths. In other words, one faulty section may be axially very short, while a second faulty section may be axially considerably longer. The faults are typically produced during the extrusion process, so that the axial lengths of such faults varies stochastically. All this leads to the necessity to store start and end coordinates of such faults or mark the faulty section over their entire axial length.

In contrast, the present invention allows to produce a faultless material strand which is stored in a storage unit, for example wound on a reel. Any faults that are produced during the extrusion process, are cut out before the material strand, which is faultless as a consequence, and is stored in the storage unit. The joints that are produced when re-joining the cutting end faces, have a uniform axial length.

In some embodiments, the joints may be produced with a quality so that such joint may be included in an applied material strand strip. In other cases such joints will have to be cut out before applying material strand strips at the application site, wherein the detection and the cutting out of such joints can be simplified against the prior art due to the uniformity of the axial length of the joints.

In the method according to at least some embodiments of the invention, the material strand which is stored in the storage unit is a faultless material strand, which means that no manufacturing faults that are produced during the extrusion process, are contained therein.

The level of what is to be regarded as a fault and what is to be regarded as faultless, can vary. Typically, an OEM sets the standard that defines the condition of being faultless. At the manufacturing site, a high quality monitoring device is typically used (for example a camera-based system), wherein the monitoring device monitors or inspects the surface of the extruded material strand and/or monitors and senses the dimensions of the extruded material strand. Therefore, faults can either be grooves, bubbles, scratches or inclusions, but may also be deformations or other dimensional deviations from a nominal shape of the extruded material strand.

In particular, the monitoring device includes at least two image sensors which monitor the extruded material strand online (i.e. while the extruded material strand is moving at the extrusion speed) under different angles.

The cutting-out step is preferably conducted while the extruded material strand is moving, i.e. online.

The re-joining step of cutting end faces is preferably conducted at standstill, so that the first strand accumulator and/or the second strand accumulator are used in order to compensate for speed/velocity differences. Namely, the extrusion process cannot be stopped, so that the extruded material strand, which is fed into an input side of the first strand accumulator, is accumulated therein, while the output side of the accumulator may be at standstill (e.g. for conducting the joining process).

In case that axially short or average faults are cut out, it is preferred that the cutting end faces are brought axially together at a joining station by releasing material from the first strand accumulator. On the other hand, if large sections of the extruded material strand are cut out (e.g. in order to guarantee the minimum joint distance between two adjacent joints), it may be preferred if a faultless material strand portion is released in a direction opposite to the extrusion direction from the second strand accumulator.

The first strand accumulator may include a tension control on the input and/or the output end thereof. The second strand accumulator may include the same tension control and/or a displacement control in order to enable the faultless material strand to be stored in a storage unit. For example, if the faultless material strand is wound up on a reel, the displacement control allows to line up different windings of the material strand side by side. On the other hand, depending on the diameter of the wound up material strand, the tension control in the second strand accumulator may operate so as to allow for an optimized storage of the faultless material strand in the storage unit.

The above-mentioned displacement control may, therefore include a lateral displacement device which is included in or provided separately from the second strand accumulator.

The faultless material strand that is stored in the storage unit may have an axial length of at least 500 m, preferably at least 800 m, in particular at least 1000 m. Typically, the maximum axial length of the faultless material strand is less than 2000 m, preferably less than 1800 m.

The faultless material strand that is stored in the storage unit of the material strand assembly may, in the best case, include no joint at all. This would mean that the entire axial length has been produced without any faults in the extrusion process. On the other hand, depending on the fault level or fault standard set by an OEM, the faultless material strand which is stored in the storage unit may include 1 to 20 joints. In a worst case scenario, the number of joints may reach 40.

The minimum joint distance between any two adjacent joints is preferably in a range from 3 m to 10 m, and is preferably in a range from 5 m to 9 m. Further, it is preferred if the minimum joint distance is larger than two times the predefined strip length of a material strand strip.

The material of the material strand is preferably a plastics or elastomer material, which is preferably radially elastically compressible, for example TPE, EPDM, etc. The material strand may be a single component material strand, made from a single material, or may be a multi-component material strand including at least two components of different materials. Typically, the material strand is a two component-strand, including for example a relatively hard component for attaching the strand strip to a vehicle opening, and a relatively soft portion for providing sealing functions, e.g. an EPDM hose attached to a attachment socket strand.

In comparison to the prior art described above, the outlay at the manufacturing site may be increased, in view of the fact that any fault or defect in the extruded material strand is cut out before the material strand is, as a faultless material strand, stored in the storage unit. On the other hand, the uniformity of the joints in the faultless material strand (if any) allows to simplify and reduce the outlay at the application site.

In the present specification, a main direction is the extrusion direction in the manufacturing apparatus or an un-storing/un-winding direction in the application/production apparatus. Any references to "upstream" or "downstream" or to "behind" or "in front of" refer to these main direction, depending on the site.

The above object is, therefore achieved in full.

In the manufacturing method according to one embodiment of the invention, it is preferred that, if a joint is produced, the position of the joint is neither recorded nor marked.

In other words, the manufacturing process does not include any additional step of marking a joint that is produced after cutting out a fault from the extruded material strand. Also, the position of such joint is not recorded.

At the application site, an inspection device is adapted to inspect the un-stored faultless material strand for joints. Such inspection device may be an image-based sensor, e.g. a camera-based sensor, that is able to detect joints, but may also be a sensor dedicated to the detection of joints. Namely, the joints may be produced by inserting a different type of material between the cutting end faces, in which case the inspection device is adapted to sense the different material. In addition, the joining step may include the use of a material that is detectable by such inspection device, e.g. a certain adhesive and/or the detection of a thread or a yarn that is used for stitching, particularly the material thereof, which may be or may include metal. In addition, any joint which uses a material different from the material of the extruded material strand, may include metallic particles or the like that can be easily detected by an inspection device at the application site. Preferably, however, the joint that is produced at the manufacturing site, is a standard joint, for example a joint produced by mirror-imaged cutting faces, optionally with a different material or an adhesive therebetween. In other cases, the standard joints can be produced from complementary, non-mirror-imaged, cutting end faces, either with a different material or an adhesive therebetween, or with a stitching or the like.

In the case of stepped complementary cutting end faces, an adhesive or the like may be arranged between cutting end face portions that are arranged parallel to the strand axis. In this case, certain gaps may be provided between those cutting end face portions that extend transversely to the strand axis.

In an alternative embodiment of the manufacturing method according to the invention, it is preferred that, if a joint is produced, the position of the joint is marked on the material strand by a single marking which has an axial marking length that is shorter than an axial joint length of the joint.

Due to the uniformity of the axial joint length of any joints included in the faultless material strand, it is possible to identify the position of a joint by a single marking which has an axial marking length that is shorter than the axial joint length.

The single marking may be on the joint, or may be upstream of the joint or may be located downstream of the joint. It is preferred, if the single marking is positioned with respect to the joint at a predefined axial distance (which may be zero, but which may also be larger than zero).

The axial marking can be a print marking on the material strand, or may be another type of marking, e.g. a transponder marking, etc.

Further, in some embodiments of the manufacturing method, if a joint is produced, the position of the joint is recorded by recording one single position.

Unlike in the prior art, where a start coordinate and an end coordinate need to be stored (due to the varying length of faults), the invention may be used to provide a faultless material strand having only joints of uniform length. This allows the position of the joint to be identified by one single axial position (one single axial coordinate). The single coordinate is preferably directly associated to the joint. Preferably, the single axial position is located at a distance upstream or downstream of the joint. This facilitates the cutting out of joints at the application site.

In another preferred embodiment of the manufacturing method of the invention, the cutting step includes the use of at least two cutters that are arranged at an axial cutter distance from each other, wherein the axial cutter distance is axially shorter than the minimum joint distance and/or wherein the axial cutter distance is axially longer than an average axial fault length.

In general, one single cutter is sufficient in order to cut-out typical small faults, wherein the single cutter is operated a first time upstream of a fault, and a second time downstream of a fault. In this case, the cutter is typically a standard cutter that cuts the extruded material strand at a right angle.

The preferred solution including two cutters is preferred because typical faults can be cut-out in one action, by which the two cutters are operated simultaneously. Also, the two cutters can have complementary cutting end faces.

The ratio of the minimum joint distance to the axial cutter distance is preferably in a range from 7:1 to 3:1. An average axial fault length can be in a range from approximately 5 cm to approximately 80 cm. Preferably, the axial cutter distance is in a range from 20 cm to 200 cm, preferably in a range from 30 cm to 150 cm, in particular in a range from 50 cm to 120 cm.

The two cutters are preferably used in order to cut out faults. In case that a minimum joint distance is to be maintained, a third cutter is preferably used in a second cutting device, which third cutter is located downstream of the two cutters (which form a first cutting device).

The two cutters are preferably arranged upstream of the joining device. The first cutter is preferably arranged upstream of the second cutter.

In the manufacturing apparatus according to at least some embodiments of the invention, it is preferred if the cutting arrangement comprises a first cutting device and a second cutting device, wherein the joining device is arranged axially between the first cutting device and the second cutting device.

The two cutting devices can preferably be operated/actuated independently from each other.

The first cutting device is preferably used for cutting out typical faults in an extruded material strand. In case that a distance between two adjacent joints would be smaller than the minimum joint distance, the first cutting device and the second device are preferably used together.

Preferably, a cutting distance between the first cutting device and the second cutting device corresponds to the minimum joint distance. The cutting device distance can be identical to the minimum joint distance, but is preferably smaller than the minimum joint distance, by an axial length of not less than 10 cm and not more than 150 cm, preferably not more than 100 cm.

In another preferred embodiment, the first cutting device comprises a first cutter and a second cutter, which are arranged at an axial cutter distance, wherein the axial cutter distance is axially longer than an average axial fault length and/or wherein the first cutter and the second cutter are operable independent from each other.

The first cutter and the second cutter are typically used to cut out faults in the extruded material strand. In this case, the two cutters are preferably operated synchronously to each other.

In order to cut out portions of the extruded material strand, which would lead to a joint distance smaller than the minimum joint distance, it is preferred if one of the first and second cutters is operated simultaneously or synchronously with a third cutter of the second cutting device.

Each of the cutters or cutting devices can be formed as knives, as notching elements, as shearing elements or the like.

In a preferred embodiment, the first cutter and the second cutter are adapted to produce complimentary cutting end faces, wherein the second cutting device comprises preferably a third cutter which is adapted to produce the same cutting end face as the second cutter.

The complimentary cutting end faces could be identical end faces which are aligned at 90° to a longitudinal direction of the strand. Preferably, however, the complementary cutting end faces are non-symmetrical to each other with respect to a plane that is arranged transverse to that longitudinal direction.

If a joint is produced with such complementary cutting end faces, the strength of the joint can be improved, at least in some cases. Further, it may be more easy to produce the joint. In addition, it may be more easy to detect a joint in an un-stored faultless material strand.

According to another preferred embodiment, the second accumulator is adapted to feed an accumulated faultless material strand to the joining device.

In case that the second cutting device is used in order to cut out a longer portion of the material strand (avoiding a too small joint distance), it is in this case preferred if the second accumulator is adapted to feed accumulated faultless material strand in a direction opposite to the extrusion direction, such that the cutting end face produced by the second cutting device can be fed into the direction of a stationary joining device upstream of the second cutting device.

As soon as the joint is produced, the second accumulator can be re-loaded before an output of the second accumulator feeds faultless material strand to the storage unit.

In the method according to at least some embodiments of the invention, for applying a material strand strip it is preferred if the inspection step includes sensing a joint and/or includes sensing a single marking identifying the joint and/or includes retrieving a recorded single position of the joint.

In the first alternative, there is no recording or marking of joints at the manufacturing site, so that, at the application site, such joint is sensed in the inspection step. In the second alternative, a single marking identifying the joint is sensed, wherein the single marking can be a printed marking on the faultless material strand or a transponder marking or the like. Similarly, in the third alternative, a recorded single position of the joint is retrieved so as to avoid providing a sensor. In the third alternative, it is not necessary to provide an inspection device at the application site. Rather, the respective single position of any joint is recorded, so that the joint can be cut out automatically on the basis of the recorded single position of the joint.

In the applying method it is further preferred, if either the material strand strip is at least partially applied to the vehicle part while still being connected to the un-stored faultless material strand, or the material strand strip is cut-off from the un-stored faultless material strand before being applied to the vehicle part.

It will be understood that the features of the invention mentioned above and those yet to be explained below can be used not only in the respective combination indicated, but also in other combinations or in isolation, without leaving the scope of the present invention.

BRIEF DESCRIPTION OF THE SEVERAL VIEWS OF THE DRAWING

Exemplary embodiments of the invention are explained in more detail in the following description and are represented in the drawings, in which.

EMBODIMENTS

Figure 1:
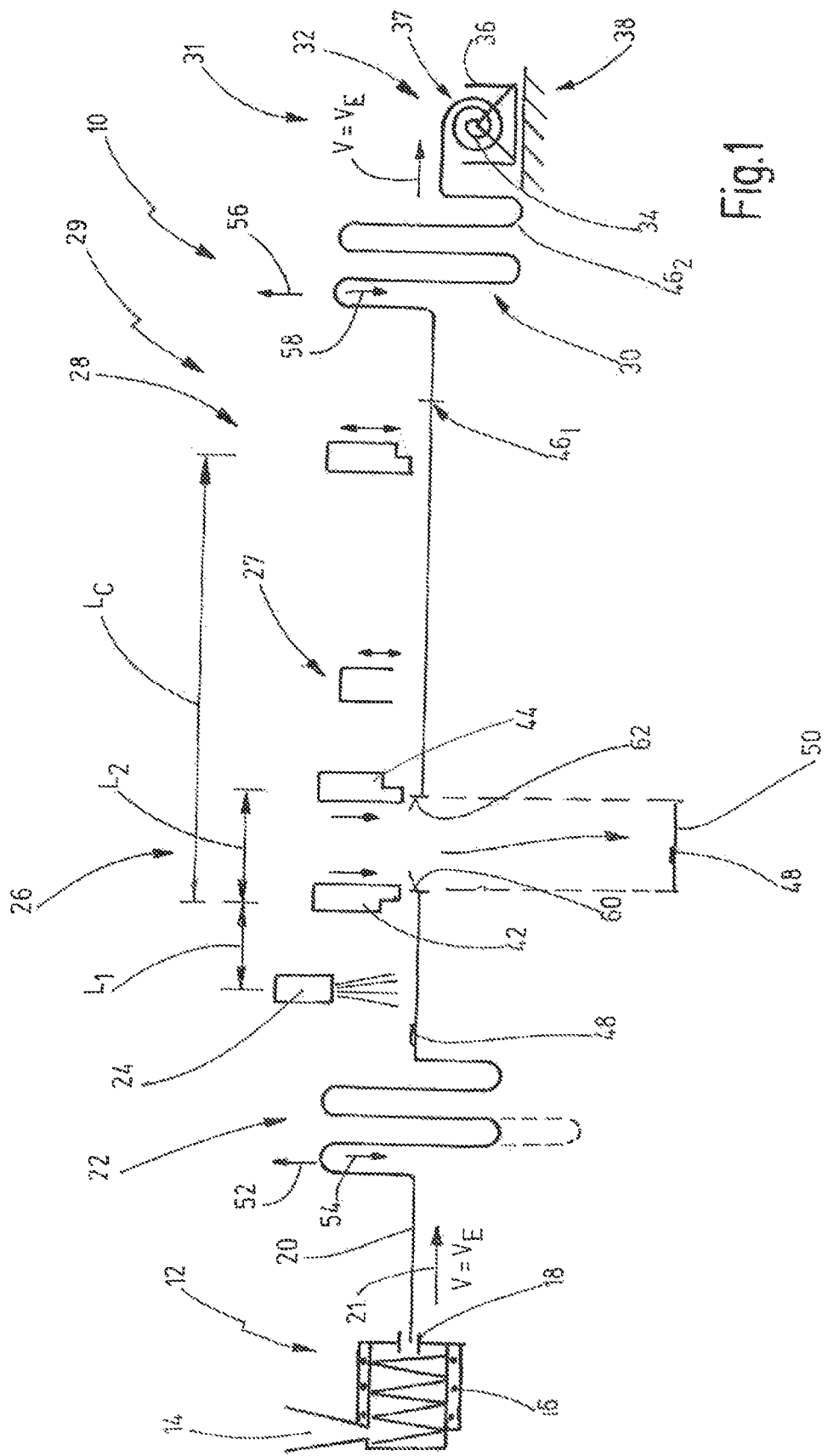
FIG. 1 is a schematic view of a manufacturing apparatus for manufacturing a material strand assembly according to an embodiment of the invention.

In FIG. 1, an embodiment of a manufacturing apparatus for manufacturing a material strand assembly is schematically shown and given the reference numeral 10.

The manufacturing apparatus 10 includes an extruder 12, which is adapted to receive strand material 14. The extruder 12 may include a heater 16 and comprises a die 18. In operation, the extruder 12 produces a material strand 20 that moves at an extrusion speed $v_E$ out of the die, along a moving direction 21.

Downstream of the extruder 12, the manufacturing apparatus 10 includes a first strand accumulator 22, a monitoring device 24, a first cutting device 26, a joining device 27, a second cutting device 28, wherein the first cutting device 26 and the second cutting device 28 form a cutting arrangement 29, a second strand accumulator 30 and a storing device 31.

The first strand accumulator 22 and the second strand accumulator 30 allow for movement speeds of the material strand between the accumulators 22, 30 that differ from the movement speed upstream of the first strand accumulator 22 and/or downstream of the second strand accumulator 30. Typically, the storing device 31 may be adapted to store a material strand at the same speed as the extrusion speed ($v_E$).

The storing device 31 is adapted to store a material strand in a storage unit 32. The storage unit 32 may have a reel 34 which is supported rotatably in a reel carrier 36, e.g. a reel box.

The material strand that is stored in the storage unit 32 is a faultless material strand 37, wherein any faults of the extruded material strand 20 have been cut out.

As soon as a predefined length of faultless material strand 37 is stored in the storage unit 32, thus forming a material strand assembly 38, the material strand assembly 38 can be transported to another site where the material strand of the material strand assembly 38 is processed, e.g. an application site at an OEM.

The material strand 20 is typically used for sealing, trimming or fastening body openings in vehicle bodies, typically in the automobile industry.

Figure 3:
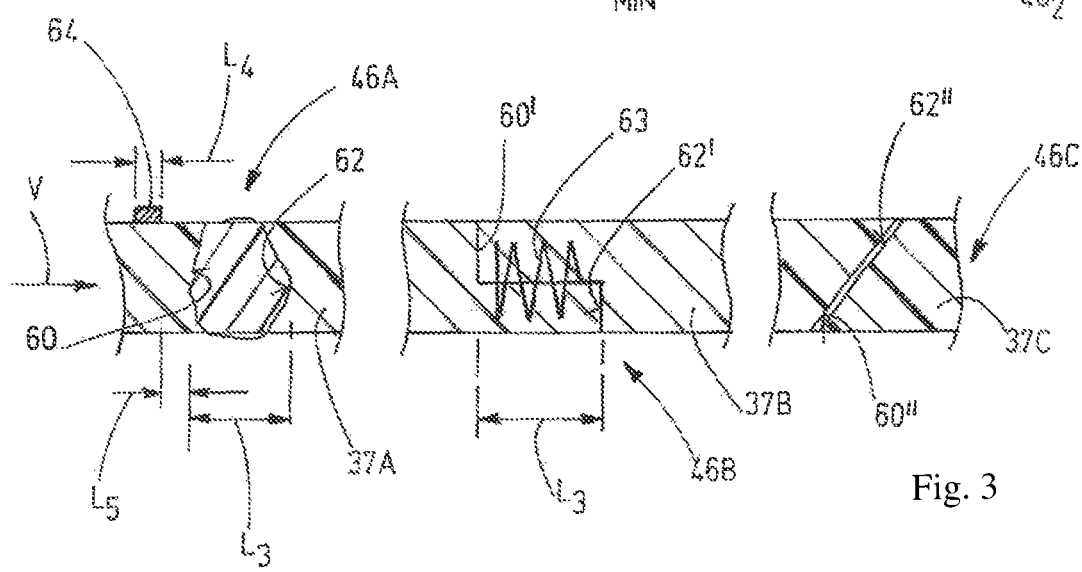
FIG. 3 shows several schematic views of different types of joints in a faultless material strand.

The first cutting device 26 may include a single cutter for preparing right-angled cutting end faces, as for example shown in FIG. 3, left side.

In the present case of FIG. 1, the first cutting device 26 includes a first upstream cutter 42 and a second downstream cutter 44. The first cutter 42 and the second cutter 44 are provided so as to prepare complementary cutting edges, as for example shown in FIG. 3, middle or right side.

The first cutter 42 and the second cutter 44 are adapted to cut out any extrusion fault 48 that has been detected by the monitoring device 24, thus producing a scrap piece 50. The joining device 27 is adapted to re-join the remaining material strand at its opposite cutting end faces (not shown in FIG. 1). The joining process conducted by the joining device 27 leads to a joint 46, two of which are shown at $46_1$ and $46_2$ in FIG. 1. The faultless material strand 27 does not include any faults 48, but may include a number of joints 46.

A distance between the monitoring device 24 and the first cutting device 26 is shown at $L_1$. The distance $L_1$ is chosen such that, at a typical maximum speed of the material strand 20, there is sufficient time for the first cutting device 26 to be operated when a fault 48 is detected by the monitoring device 24.

The axial distance between the first cutter 42 and the second cutter 44 is shown at $L_2$.

The length $L_2$ may, for example, correspond to an average axial fault length. In the present embodiment, $L_2$ is chosen to be in a range from 50 cm to 150 cm, for example 1 m (100 cm).

An axial distance between the first cutter 42 and the second cutting device 28 (which may include a third cutter) is shown in FIG. 1 at $L_C$.

The length $L_C$ (the cutting device distance) corresponds preferably to a minimum joint distance $L_{MIN}$, explained below.

The cutting device distance $L_C$ is preferably shorter than $L_{MIN}$.

The ratio of $L_C$ to $L_2$ is preferably in a range from 7:1 to 3:1, preferably in a range from 4.5:1 to 6:1.

If the movement speed of the material strand downstream of the first strand accumulator 22 is set to be smaller than the extrusion speed $v_E$, the first strand accumulator 22 can be loaded, as shown at 52. On the other hand, if the material strand speed downstream of the first strand accumulator 22 is set to be higher than the extrusion speed $v_E$, the first strand accumulator 22 can be unloaded as shown at 54.

Similarly, the second strand accumulator 22 can be loaded, as shown at 56, if the material strand speed upstream of the second strand accumulator 30 is higher than the material strand speed downstream of the second strand accumulator 30. On the other hand, if the speed relation is reversed, the second strand accumulator 30 can be unloaded, as shown at 58.

The cutters 42, 44 may include knifes or notching devices, and can be operated online, i.e. while the material strand moves along the first cutting device 26. On the other hand, it is also possible to stop the material strand when conducting the cutting-out step.

When the scrap piece 50 is cut out from the material strand, two opposing cutting end faces 60, 62 are produced, which can be re-joined in the joining device 27, thus producing a joint 46.

The joining device 27 is preferably a stationary device. Similarly, the cutters 42, 44 and the second cutting device 28 are stationary. In other embodiments, however, these elements can be axially movable devices, so that these devices can be moved synchronously with the material strand.

Figure 2F:
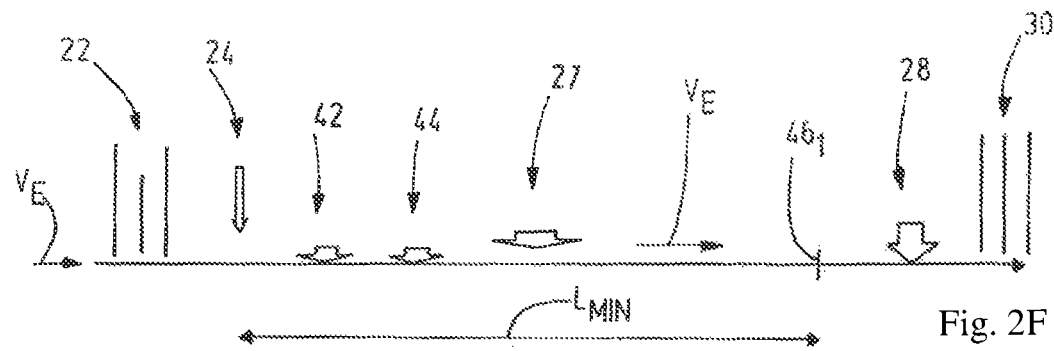
FIGS. 2A to 2N are sequences of operation in a method for manufacturing a material strand assembly using a manufacturing apparatus according to another embodiment of the invention.
Figure 2G:
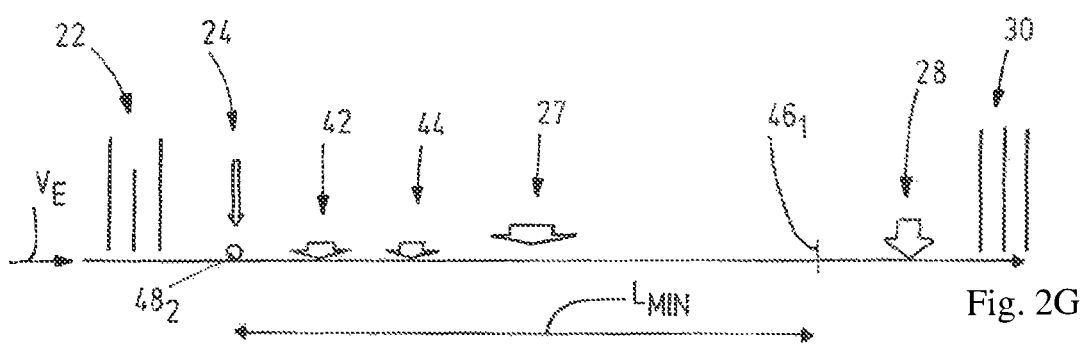
Figure 2H:
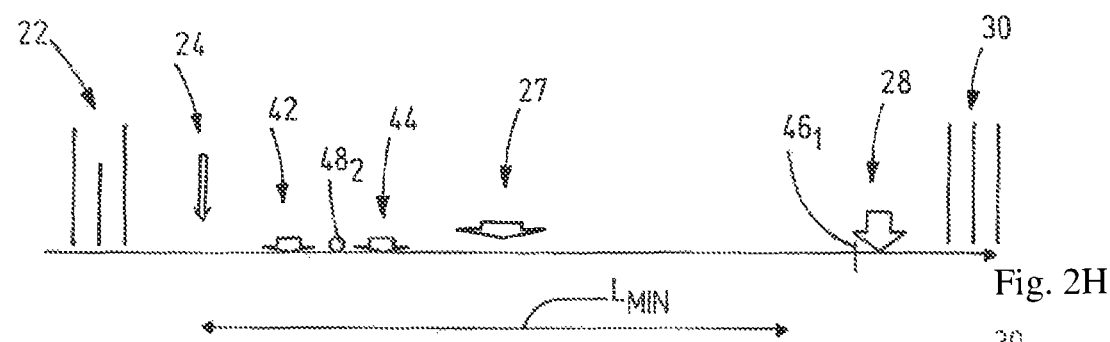
Figure 2I:
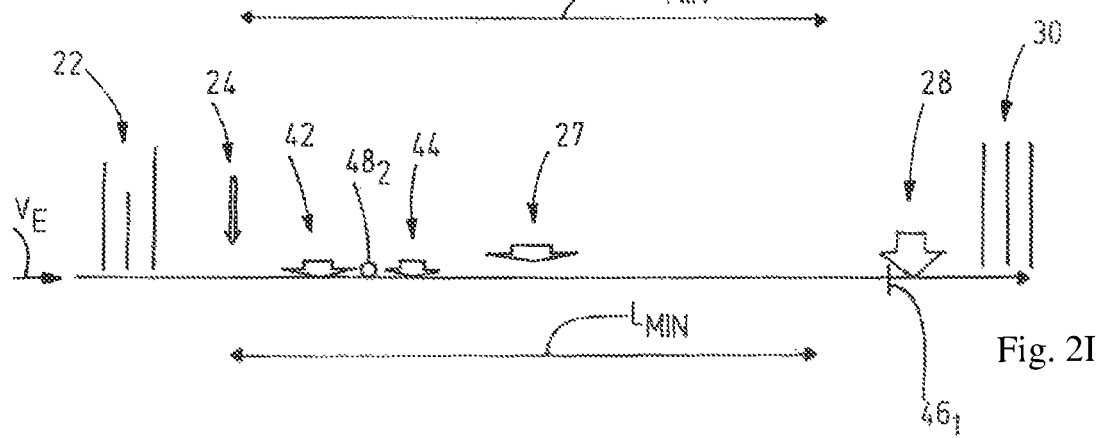
Figure 2J:
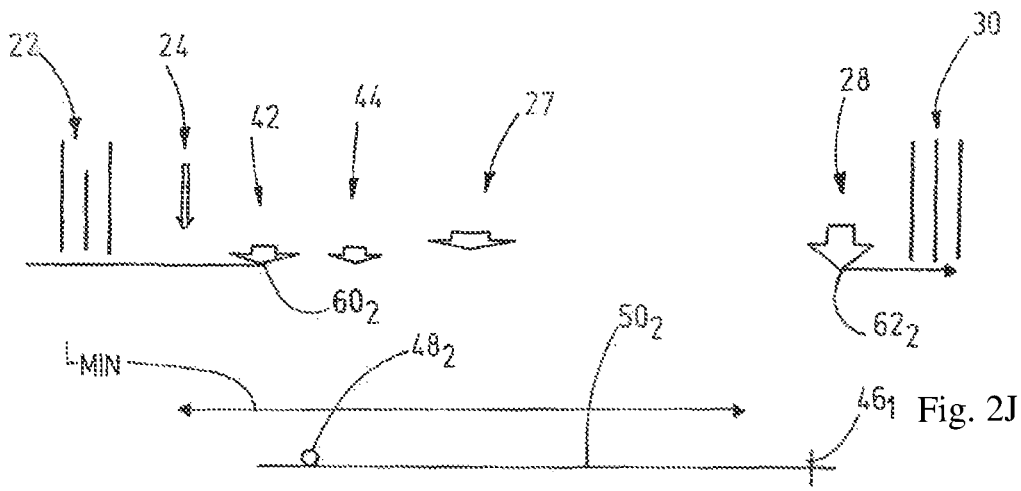
Figure 2K:
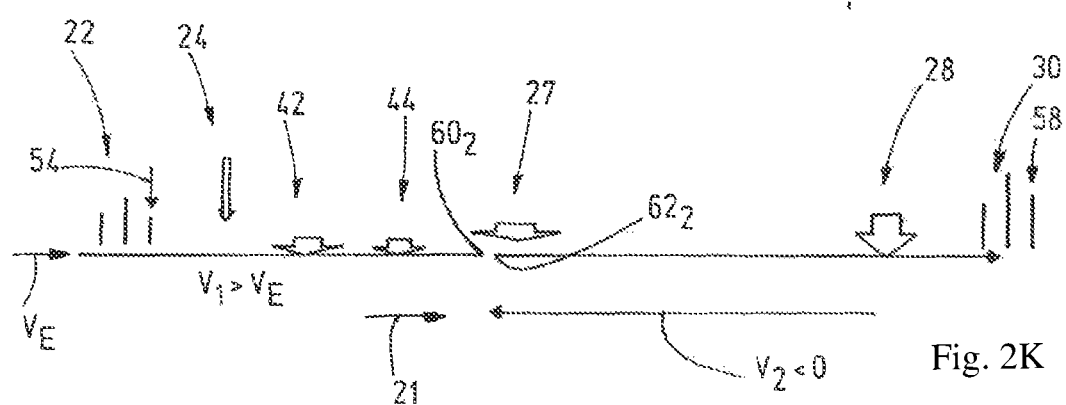
Figure 2L:
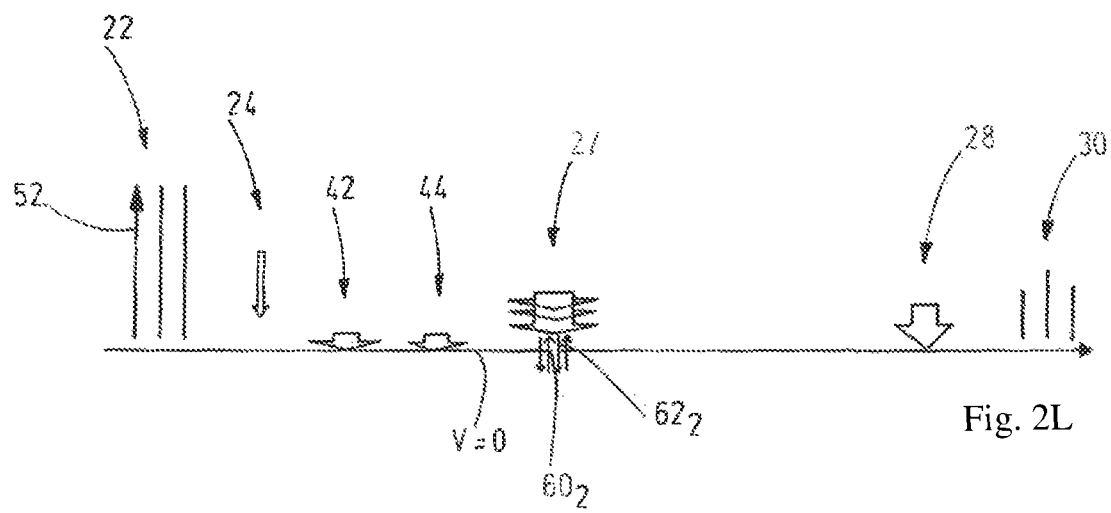
Figure 2M:
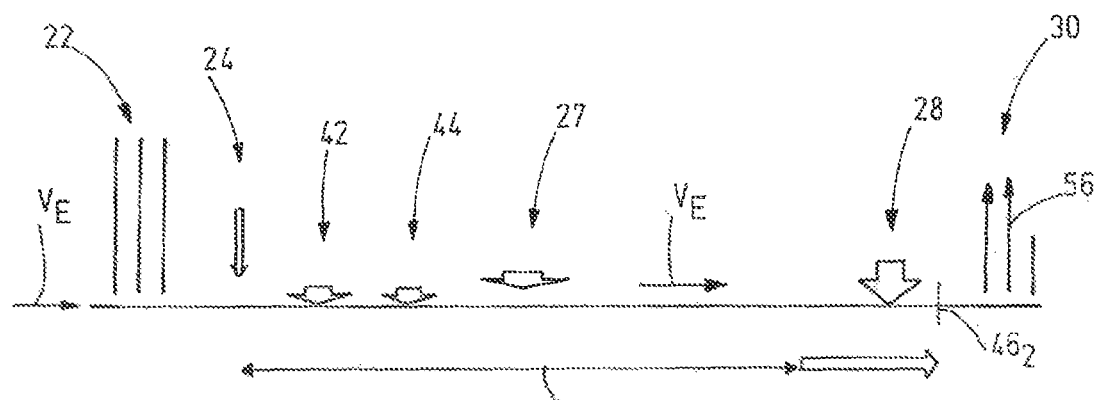
Figure 2N:
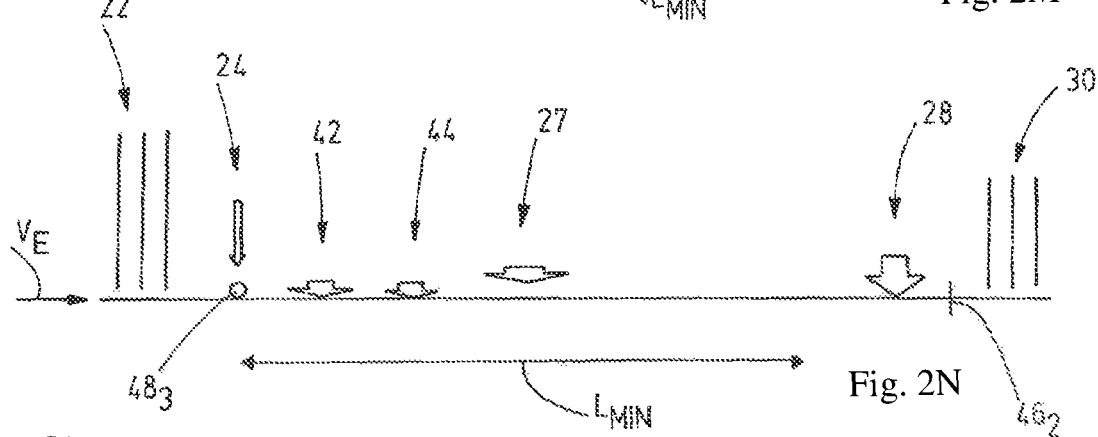

In FIGS. 2A to 2N, a sequence of operation of a manufacturing apparatus 10 is shown, which corresponds with respect to construction and function to the manufacturing apparatus 10 of FIG. 1. Similar elements are given the same reference numerals. In the following, the operation is explained in detail.

In FIG. 2A, a situation is shown where the material strand 20 is moved in moving direction 21, wherein a fault $48_1$ is detected by the monitoring device 24.

In FIG. 2B, the fault $48_1$ has been moved into the area axially between the first cutter 42 and the second cutter 44.

In FIG. 2C, the first cutter 42 and the second cutter 44 are operated simultaneously, thus cutting out a scrap piece $50_1$ on which the fault $48_1$ is located, thus producing two opposing cutting end faces $60_1$, $62_1$ in the area of the cutters 42, 44.

In FIG. 2D, the first strand accumulator 22 is unloaded (schematically shown at 54), so that the material strand downstream of the first strand accumulator 22 moves with a speed $v_1$ which is larger than $v_E$, such that the two cutting end faces $60_1$, $62_1$ are approaching each other.

In FIG. 2E, the cutting end faces $60_1$, $62_1$ are close to each other and are located in the area of the joining device 27, which is stationary, so that the material strand is brought to a standstill, such that the material strand speed $v_2$=0. In this case, the first strand accumulator 52 is loaded, as shown at 52 in FIG. 2E. The joining device 27 is operated so as to stitch overlapping ends of the cutting end phases $60_1$, $62_1$. In the joining device 27, therefore, a first joint $46_1$ is produced.

In FIG. 2F, it is shown that the material strand is moving again at the extrusion speed $v_E$, so that the accumulators 22, 30 are neither loaded nor unloaded. The first joint $46_1$ has moved into the direction of the second cutting device 28.

In FIG. 2G, it is shown that the joint $46_1$ has reached an axial distance from the monitoring device 24, which is $L_{MIN}$, which is a minimum joint distance. Namely, the faultless material strand 37 that is to be stored in the storage unit 32 may have joints, but any two adjacent joints must be at the minimum joint distance $L_{MIN}$ from each other. The distance $L_{MIN}$ is preferably in a range from 3 m to 10 m, particularly in a range from 4 m to 7 m, preferably in a range from 4.5 m to 6 m.

In FIG. 2F, it is shown that no further fault 48 has been detected within the minimum joint distance $L_{MIN}$, so that the process can be continued by moving the material strand and storing the faultless material strand 37 in the storage unit 32.

FIG. 2G shows a different situation. Here, a second fault $48_2$ has been detected by the monitoring device 24 at a distance from the first joint $46_1$, which is less than or equal to $L_{MIN}$. Here, a distance between the first joint and a second joint for the second fault $48_2$ would be axially shorter than the minimum joint distance $L_{MIN}$.

Therefore, the process continues with the situation of FIG. 2H, where the second fault $48_2$ is located between the first and the second cutter 42, 44. The first joint $46_1$ is still located upstream of the second cutting device 28 in this case.

As shown in FIG. 2I, the first cutter 42 and the second cutting device 48 are operated simultaneously, so that a second scrap piece $50_2$ is produced (as shown in FIG. 2J), which includes the first joint $46_1$ and the second fault $48_2$. Further, two opposing cutting end faces $60_2$, $62_2$ are produced at the locations of the first cutter 42 and the second cutting device 28, respectively.

In order to bring the opposing cutting end faces $60_2$, $62_2$ into the area of the joining device 27, the first strand accumulator 22 is unloaded, as shown at 54, and, further, the second strand accumulator 30 is unloaded as shown at 58. The unloading of the first strand accumulator 22 has the effect that the material strand speed $v_1$ downstream of the first strand accumulator 22 is higher than the extrusion speed $v_E$. The unloading 58 of the second strand accumulator 30 has the effect that the cutting end face $62_2$ is moved in a direction opposite to the moving direction (extrusion direction), so that the material strand that is moved out of the second strand accumulator 30 is moved at a speed $v_2$ which is smaller than zero (negative speed).

Therefore, as shown in FIG. 2L, the cutting end faces $60_2$, $62_2$ meet at the joining device 27, so that, at a material strand speed of v=0, a second joint $46_2$ is produced. As shown in FIG. 2M, the second joint $46_2$ has moved beyond the second cutting device 42, without that another fault having been detected in the monitoring device. Thus, the second joint $46_2$ is at the minimum joint distance from any upstream joint, and the second joint $46_2$ can be fed into the second strand accumulator 30 as shown at 56 in FIG. 2M. In FIG. 2M, the speed with which the faultless material strand 37 is stored in the storage unit 32 is preferably less than $v_E$. As shown in FIG. 2N, a third fault $48_3$ is detected after the second joint $46_2$ has passed the second joining device 28. The third fault $48_3$ will be dealt with in a manner identical to what has been described with respect to FIGS. 2A to 2F.

In FIG. 3, three different types of joints 46 are shown. On the left hand side in FIG. 3, a joint 46A of a faultless material strand 37A is shown, wherein a material dissimilar from the material of the material strand 37A is inserted between the cutting end faces 60, 62, wherein the joining material is for example a thermoplastic elastomer material or any other thermoplastic joining material which, by way of heating, produces a thermoplastic weld at the cutting end faces 60, 62.

In the middle portion of FIG. 3, a joint 46B is shown, wherein the cutting end faces 60', 62', produced by special cutters 42, 44, have complementary shapes. For example, the cutters 42, 44 can be formed by L-shaped notching elements. Therefore, these L-shaped cutting end faces are complementary to each other and overlap axially, such that a stitching 63 can be produced in the joining device 27, so as to join the material strand portions of the faultless material strand 37B together. As an alternative to the stitching 63, the cutting end faces portions that are aligned parallel to the longitudinal direction, could be connected by adhesive or the like, so that the portions of the cutting end faces 60', 62', that are arranged transverse and at the outer border of the material strand 37B, could be distant from each other and present gaps that can be easily detected.

In FIG. 3, the joint 46C includes cutting end faces 60", 62", that are complementary to each other by having complementary slopes, thus, again, producing a faultless material strand 37C.

As shown in the left hand part of FIG. 3, any joint 46A (or 46B, 46C or any other joint) can be marked by a marking 64, wherein an axial length $L_4$ of the marking 64 is shorter than an axial length $L_3$ of the joint. Further, the marking 64 may have an axial distance $L_5$ from the joint 46A, wherein $0 \le L_5 \le 20$ cm, for example, either upstream or downstream of the joint.

On the other hand, the above joints 46A, 46B, 46C may not be marked at all.

As a third alternative, an axial position of each of the joints 46A, 46B, 46C may be recorded in a recording device, which is assigned to the material strand assembly 38. As explained later, at an assembly site, such recording device can be used in order to identify the positions of joints of the faultless material strand 37.

Figure 4:
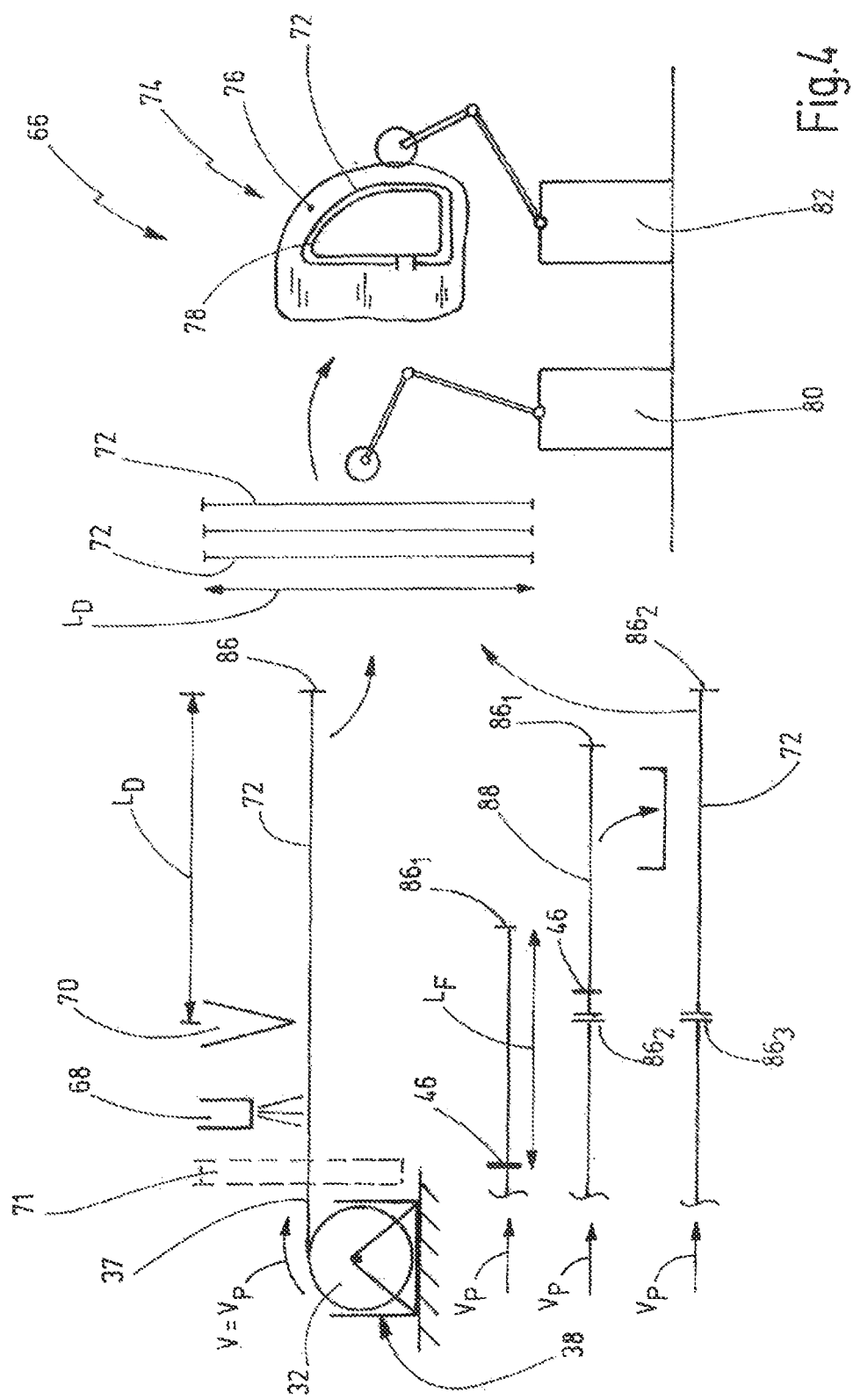
FIG. 4 is a schematic view of an apparatus for applying a material strand strip to a vehicle part.

In FIG. 4, an apparatus for applying a material strand strip to a vehicle part is schematically shown and is given reference 66. The production apparatus 66 includes an inspection device 68. The inspection device 68 is designed to inspect the faultless material strand 37 that is un-stored from the material strand assembly 38, at a production speed $v_P$. The inspection device 68 is preferably a camera-based inspection device that is able to clearly identify joints, wherein the joints may have been produced by a mirror weld joining step, either with or without material between cutting end faces. The inspection device may, however, also be another type of inspection device, e.g. a metal detection device. Downstream of the inspection device 68, the production apparatus 66 includes a separation device 70 which is adapted to separate or cut the material strand.

Between the material strand assembly 38 and the inspection device 68, optionally, a production accumulator 71 can be provided which has a function similar to that of the first strand accumulator 22 of the manufacturing apparatus 10 of FIG. 1.

The separation device 70 is adapted to cut off strand strips 72 from the endless and faultless material strand 37, which strand strips 72 have an axial length $L_D$ which is a predefined strip length adapted to the application purpose.

The production apparatus 66, further, includes an applying device 74. The applying device 74 is designed to apply a strand strip 72 to a vehicle part, in particular to a body opening of a vehicle body. As shown schematically in FIG. 4, the applying device 74 may be adapted to apply a strand strip 72 to a window opening 78 of a vehicle door 76.

The applying device 74 is preferably adapted to apply the strand strip 72 automatically, using at least one robot. In FIG. 1, two robots are shown at 80, 82. A first robot 80 may be used to handle the strand strips 72. A second robot 82 may be adapted to handle and three-dimensionally move the vehicle part (vehicle door 76).

In general, it is possible to provide an applying device 74, wherein the strand strip 72 is applied to the vehicle part while the strand strip 72 is still attached to the faultless material strand 37 (up until to the last portion). In FIG. 4, however, it is shown that strand strips 72 are cut off in advance before being applied to the vehicle part.

FIG. 4 also shows that the faultless material strand 37, when un-stored from the storage unit 32, has a downstream end 86. When the downstream end 86 has reached the distance $L_D$ from the separation device 70, the separation device 70 is operated, so as to cut off the strand strip 72, and producing a new downstream end of the material strand 37.

In FIG. 4, left hand side, a situation is shown where a joint 46 is located at a distance $L_F$ from a downstream end $86_1$, which distance $L_F$ is shorter than the predefined strip length $L_D$.

Therefore, in a second step, the joint 46 is moved passed the separation device 70, and the separation device 70 is operated, so that a second downstream end $86_2$ is produced. The strand portion 88 between the first downstream end $86_1$ and the second downstream end $86_2$, including the joint 46, is discarded as waste.

Finally, it is shown that the second downstream end 86 has then again moved at the production speed $v_P$ to a location, where it is located at the distance $L_D$ from the cutting device 70 and wherein no joint is arranged within this distance, so that the separation device 70 can again be operated, so that another strand strip 72 can be cut off and used for applying it to the vehicle part, creating a third downstream end $86_3$.

What is claimed is:

1. A method for manufacturing a material strand assembly for a vehicle, including the steps of:

extruding strand material in an extruder so that an extruded material strand is produced, monitoring the quality of the extruded material strand so as to detect faults of the extruded material strand, in case of a detection of a fault, cutting out the fault from the material strand, using a cutting arrangement, and re-joining cutting end faces, thus producing a joint, so that a faultless material strand is produced, wherein the cutting-out step is conducted such that any two adjacent joints are at a minimum joint distance from each other, and storing the faultless material strand in a storage unit so as to produce the material strand assembly, wherein the faultless material strand is passed through a second strand accumulator between a cutting arrangement and the storage unit, and wherein the second strand accumulator is adapted to feed an accumulated faultless material strand to the storage unit.

2. The method of claim 1, wherein the cutting step includes the use of at least two cutters that are arranged at an axial cutter distance from each other, wherein the axial cutter distance is axially shorter than the minimum joint distance.

3. The method of claim 1, wherein the cutting step includes the use of at least two cutters that are arranged at an axial cutter distance from each other, wherein the axial cutter distance is axially longer than an average axial fault length.

4. A method for manufacturing a material strand assembly for a vehicle, including the steps of:

extruding strand material in an extruder so that an extruded material strand is produced, monitoring the quality of the extruded material strand so as to detect faults of the extruded material strand, in case of a detection of a fault, cutting out the fault from the material strand, using a cutting arrangement with first and second cutters, and re-joining cutting end faces, thus producing a joint, so that a faultless material strand is produced, wherein the cutting-out step is conducted by placing the fault between the first and second cutters and cutting out the fault and the re-joining step is conducted such that any two adjacent joints are at a minimum joint distance or more from each other, and storing the faultless material strand in a storage unit so as to produce the material strand assembly, wherein a feeding step includes at least one of passing the extruded material strand through a first strand accumulator between the extruder and the cutting arrangement and passing the faultless material strand through a second strand accumulator between the cutting arrangement and the storage unit.

5. The method of claim 4, wherein, if a joint is produced, the position of the joint is neither recorded nor marked.

6. The method of claim 4, wherein, if a joint is produced, the position of the joint is marked on the material strand by a single marking which has an axial marking length that is shorter than an axial joint length of the joint.

7. The method of claim 4, wherein, if a joint is produced, the position of the joint is recorded by recording one single axial position that identifies the joint.

8. The method of claim 4, wherein the cutting step includes the use of at least two cutters that are arranged at an axial cutter distance from each other, wherein the axial cutter distance is axially shorter than the minimum joint distance.

9. The method of claim 4, wherein the cutting step includes the use of at least two cutters that are arranged at an axial cutter distance from each other, wherein the axial cutter distance is axially longer than an average axial fault length.

* * * * *